(12) United States Patent
Christianson et al.

(10) Patent No.: US 8,380,230 B2
(45) Date of Patent: Feb. 19, 2013

(54) SMS-SPONSORED WAP ADVERTISEMENT

(75) Inventors: Ryan Christianson, Lynnwood, WA (US); John Kehle, Kirkland, WA (US); John Dietz, Redmond, WA (US)

(73) Assignee: Disney Enterprises, Inc., Burbank, CA (US)

( * ) Notice: Subject to any disclaimer, the term of this patent is extended or adjusted under 35 U.S.C. 154(b) by 440 days.

(21) Appl. No.: 12/553,152

(22) Filed: Sep. 3, 2009

(65) Prior Publication Data
US 2011/0053568 A1    Mar. 3, 2011

(51) Int. Cl.
*H04W 4/14* (2009.01)
*G06Q 30/00* (2012.01)
*H04M 3/42* (2006.01)

(52) U.S. Cl. .............. 455/466; 455/414.1; 705/14.64

(58) Field of Classification Search ........ 455/3.01–3.06, 455/404.1–404.2, 412.1–414.4, 456.1–456.6, 455/466
See application file for complete search history.

(56) References Cited

U.S. PATENT DOCUMENTS

| | | | |
|---|---|---|---|
| 2003/0096625 A1 | 5/2003 | Lee et al. | |
| 2003/0144016 A1* | 7/2003 | Kolsky et al. | 455/517 |
| 2003/0233329 A1* | 12/2003 | Laraki et al. | 705/52 |
| 2005/0177419 A1* | 8/2005 | Choi et al. | 705/14 |
| 2007/0165805 A1 | 7/2007 | Altberg et al. | |
| 2009/0048913 A1* | 2/2009 | Shenfield et al. | 705/14 |
| 2009/0172746 A1* | 7/2009 | Aldrey et al. | 725/61 |
| 2010/0121735 A1 | 5/2010 | Shimooka | |

FOREIGN PATENT DOCUMENTS

| | | |
|---|---|---|
| JP | 2002024587 | 1/2002 |
| JP | 2002041349 | 2/2002 |
| JP | 2009501381 | 1/2009 |
| JP | 2009-530703 | 8/2009 |
| WO | WO2007010233 | 1/2007 |
| WO | WO2007105893 | 9/2007 |
| WO | WO2009/008091 | 1/2009 |

* cited by examiner

*Primary Examiner* — Ajit Patel
*Assistant Examiner* — Erica Navar
(74) *Attorney, Agent, or Firm* — Patterson & Sheridan, LLP

(57) ABSTRACT

Various embodiments of systems, methods, computer devices, and computer software for providing an integrated SMS/WAP advertisement are disclosed. One embodiment comprises a system for providing SMS-sponsored WAP advertisements. One such system comprises a short messaging service (SMS) application server and a web server. The SMS application server is configured to send a short message service (SMS) message to a mobile terminal that has an embedded link to a wireless access protocol (WAP) site. The embedded link includes a predetermined parameter identifying an advertiser associated with the SMS message. The web server is configured to receive a request for the WAP site. If the request includes the predetermined parameter, it is determined that the request originated from the SMS message and the WAP site is provided to the mobile terminal with an advertisement associated with the advertiser.

18 Claims, 5 Drawing Sheets

SMS-SPONSORED WAP ADVERTISEMENT

BACKGROUND

Short message service (SMS) is a globally-accepted wireless service that enables the transmission of relatively short alphanumeric or text messages between mobile subscribers and other external systems, such as SMS applications, which support SMS. One standard for implementing SMS is defined by The Third Generation Partnership Project (3GGP) in their Technical Specifications Document Number 3GPP TS 23.040 V6.6.0 entitled "$3^{rd}$ Generation Partnership Project; Technical Specification Group Terminals; Technical Realization of the Short Message Service (SMS)", which is hereby incorporated herein by reference it its entirety. Because of the significant growth in the number of consumers using wireless communication devices (e.g., mobile phones, smart phones, personal digital assistants, automobile dashboard-type GPS and other devices, etc.) and the frequency with which users send SMS messages using these devices, SMS has achieved huge success in the wireless industry. SMS is now a significant revenue generator for wireless carriers and SMS application service providers. While some SMS implementations generate revenue from end users based on subscription revenues (e.g., mobile carrier or SMS application subscriptions), others generate or supplement revenue from advertisements.

SMS technology, however, suffers from the problem that (as compared to other online or web-based delivery systems) there is a relatively high per message cost for sending SMS messages due to the infrastructure of the carrier network. To offset this cost, one revenue model involves selling sponsorships to advertisers. The provider of the SMS message enables an advertiser to place a text advertisement or other information in the contents of the message. This model does provide some revenue opportunities, although they are limited because of the simplicity of the advertising content and the inherent presentation limitations of SMS technology.

Some SMS providers attempt to address this problem by supplementing the content of the SMS message with links to other online resources. For example, the SMS message may include a link to a mobile web site (e.g., a wireless access protocol (WAP) site), where the user may view additional information via a browser. This solution does offer an additional revenue opportunity by enabling the provider of the WAP site to sell advertisements on the WAP site. However, the revenues generated from WAP advertisements cannot be allocated to the SMS provider, and there is no mechanism for extending the SMS sponsorship to the WAP site. Thus, despite the growth and commercial success of SMS technology, there remains a need for improved systems and methods for providing advertisements using SMS technology.

SUMMARY

Various embodiments of systems, methods, computer devices, and computer software for providing an integrated SMS/WAP advertisement are disclosed. An embodiment comprises a method of advertising comprising: sending a short message service (SMS) message to a device, the SMS message comprising a link to a mobile web site and the link having a predetermined parameter associated with a sponsor of the SMS message; receiving a request for the link; determining that the request for the link originated from the SMS message based on the predetermined parameter; and providing the mobile site to the device with an advertisement associated with the sponsor of the SMS message.

Another embodiment comprises a system for providing SMS-sponsored WAP advertisements. One such system comprises a short message service (SMS) application server and a web server. The SMS application server is configured to send a short message service (SMS) message to a mobile terminal that has an embedded link to a wireless access protocol (WAP) site. The embedded link includes a predetermined parameter identifying an advertiser associated with the SMS message. The web server is configured to receive a request for the WAP site. If the request includes the predetermined parameter, it is determined that the request originated from the SMS message and the WAP site is provided to the mobile terminal with an advertisement associated with the advertiser.

A further embodiment comprises a computer program embodied in a computer-readable medium for providing SMS-sponsored WAP advertisements. One such computer program comprises logic configured to: receive a request for a link to a wireless access protocol (WAP) site; determine that the request for the link originated from a short message service (SMS) message; and serve the WAP site with an advertisement associated with an advertiser sponsoring the SMS message.

DETAILED DESCRIPTION

Figure 1:
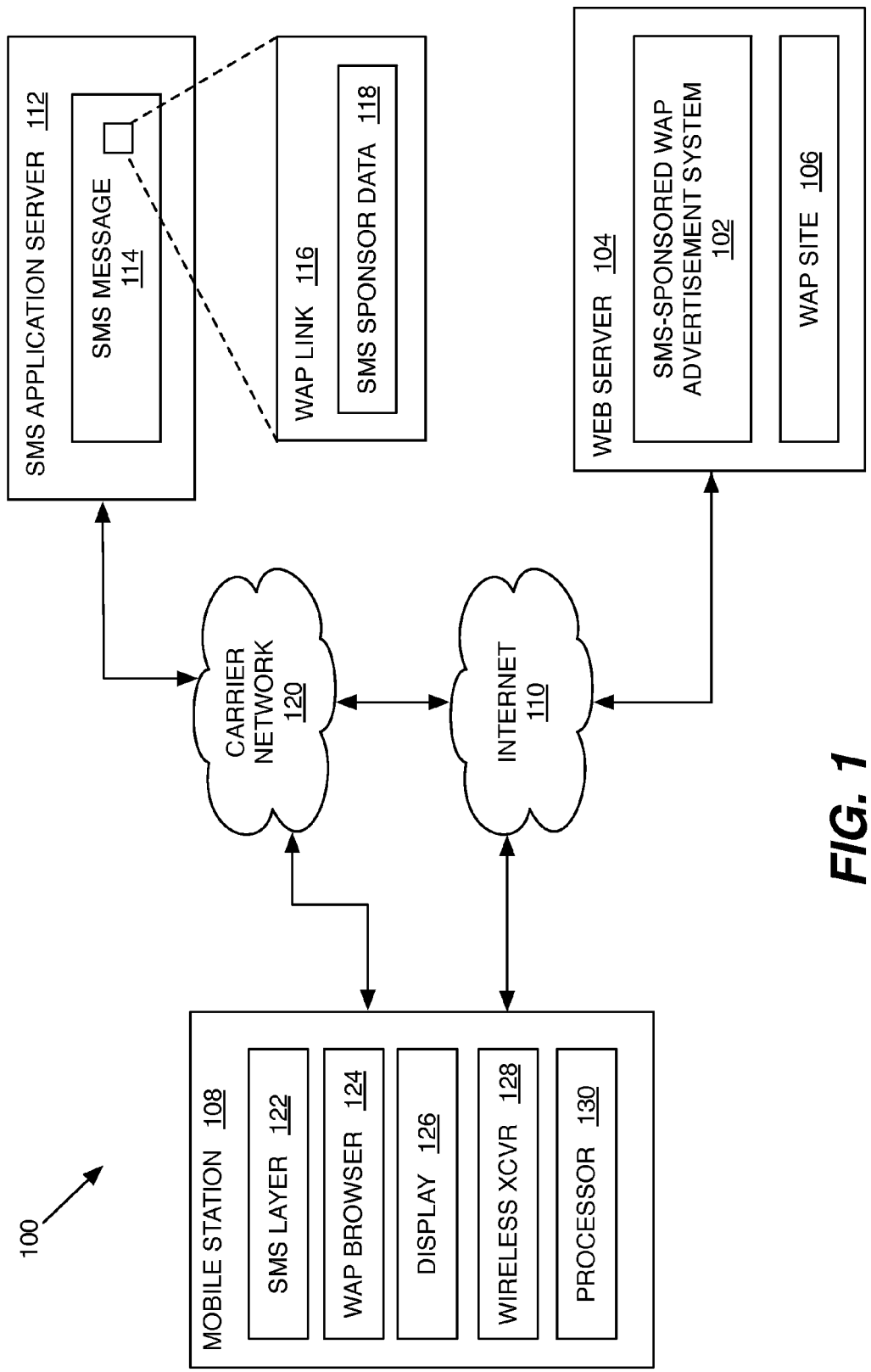
FIG. 1 is a block diagram illustrating an embodiment of a system for providing an SMS-sponsored WAP advertisement.

FIG. 1 illustrates a system 100 representing an exemplary working environment for implementing various embodiments of an SMS-sponsored WAP advertisement. The system 100 comprises an SMS-sponsored WAP advertisement system 102 embodied in, or operatively coupled to, a web server 104. The web server 104 provides a mobile web site (e.g., a WAP site 106) to mobile station(s) 108 via a communication network, such as, for example, a carrier network 120 or the Internet 110. In an embodiment, the system 100 further comprises an SMS application server 112 that provides an SMS application to mobile station(s) 108 via a communication network, such as carrier network 120. Any suitable SMS application may be implemented, although in an embodiment the SMS application server 112 is configured to provide a mobile alert service. The mobile alert service may provide, for example, news-related alerts, sports-related alerts, score updates, or other types of alerts or content to subscribers of the service. Regardless the functionality of the SMS application, the SMS application server 112 provides specially-configured SMS messages 114 for enabling the SMS-sponsored WAP advertisement.

As illustrated in FIG. 1, the SMS messages 114 include an embedded link 116 to the WAP site 106. The WAP link 116 may comprise, for example, a uniform resource locator (URL) associated with the WAP site 106. The URL may contain, for example, the name of the protocol to be used to access the file resource (e.g., hypertext transfer protocol (HTTP)), a domain name that identifies a specific computer on the Internet, a pathname, and/or a hierarchical description that specifies the location of the resource on the web server 104. An aspect of the SMS application is that the SMS message 114 and/or the link 116 include data related to an advertiser that sponsors the SMS message 114 and/or the WAP link 116 (e.g., SMS sponsor data 118). The SMS sponsor data 118 comprises one or more parameters identifying that the WAP link 116 originated from the SMS message 114. The parameter(s) may also indicate the identity of the SMS sponsor (e.g., by a unique identifier, by using query strings, etc.).

As described below in more detail, when the SMS message 114 is sent to a mobile station 108, the user may select the WAP link 116 to, for example, obtain additional or alternative information about the content of the message. When the WAP link 116 is selected, the SMS-sponsored advertisement system 102 uses the SMS sponsor data 118 to determine that the WAP link 116 originated from the sponsored SMS message 114. In an alternative embodiment, the SMS-sponsored advertisement system 102 may determine the SMS sponsor from the WAP link 116 without associated SMS sponsor data 118. Based on the determination that the WAP link 116 originated from the SMS message 114, the WAP site 106 may be configured to extend the sponsorship of the SMS message 114 to the WAP site 106. In other words, the sponsor of the SMS message 114 may be enabled to also sponsor the WAP site 106 when it is accessed via the WAP link 116 embedded in the SMS message 114. In this manner, the WAP site 106 may be provided to the mobile station 108 with an advertisement related to the advertiser identified by the data embedded in the SMS message 114.

Referring again to FIG. 1, it should be appreciated that the mobile station 108 includes appropriately-configured hardware and software for supporting these or other features. For example, the mobile station 108 may comprise an SMS layer 122, a WAP browser 124, a display 126, a wireless transceiver 128, and a processor 130. The SMS layer 122 comprises the functionality for supporting the transmission and receipt of SMS messages 114 via carrier network 120, based on the standards mentioned above or other SMS implementations. The WAP browser 124 comprises a user interface (UI) software application that enables a user to view and interact with text, images, videos, audio or other information located on mobile web sites. The WAP browser 124 is configured to support one or more of the various standards for implementing the wireless access protocol. The display 126 comprises any suitable device for displaying the information associated with the SMS layer 122, the WAP browser 124, and other applications residing on the mobile station 108. The processor 130 comprises the hardware for fetching and executing any logical functions embodied in the mobile station 108.

Having described the general working environment and the basic components of the system 100, the SMS-sponsored WAP advertisement system 102 will be described in more detail with reference to FIGS. 2-5. It should be appreciated that the SMS-sponsored WAP advertisement system 102 comprises the logic for providing certain functions for implementing the SMS-sponsored WAP advertisement. Furthermore, the SMS-sponsored WAP advertisement system 102 may be implemented in software, hardware, firmware, or a combination thereof. In an embodiment, the systems are implemented in software or firmware that is stored in a memory associated with the web server 104 and/or associated components and that are executed by a suitable instruction execution system. In software or firmware embodiments, the logic may be written in any suitable computer language. Portions of the logic may reside on the web server 104, while other portions may reside on the mobile station 108 or the SMS application server 112. In hardware embodiments, the systems may be implemented with any or a combination of the following, or other, technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One of ordinary skill in the art will appreciate that any process or method descriptions associated with the operation of the SMS-sponsored WAP advertisement system 102 may represent modules, segments, logic or portions of code which include one or more executable instructions for implementing logical functions or steps in the process. It should be further appreciated that any logical functions may be executed out of order from that described, including substantially concurrently or in reverse order, depending on the functionality involved, as would be understood by those reasonably skilled in the art. Furthermore, the SMS-sponsored WAP advertisement system 102 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 2:
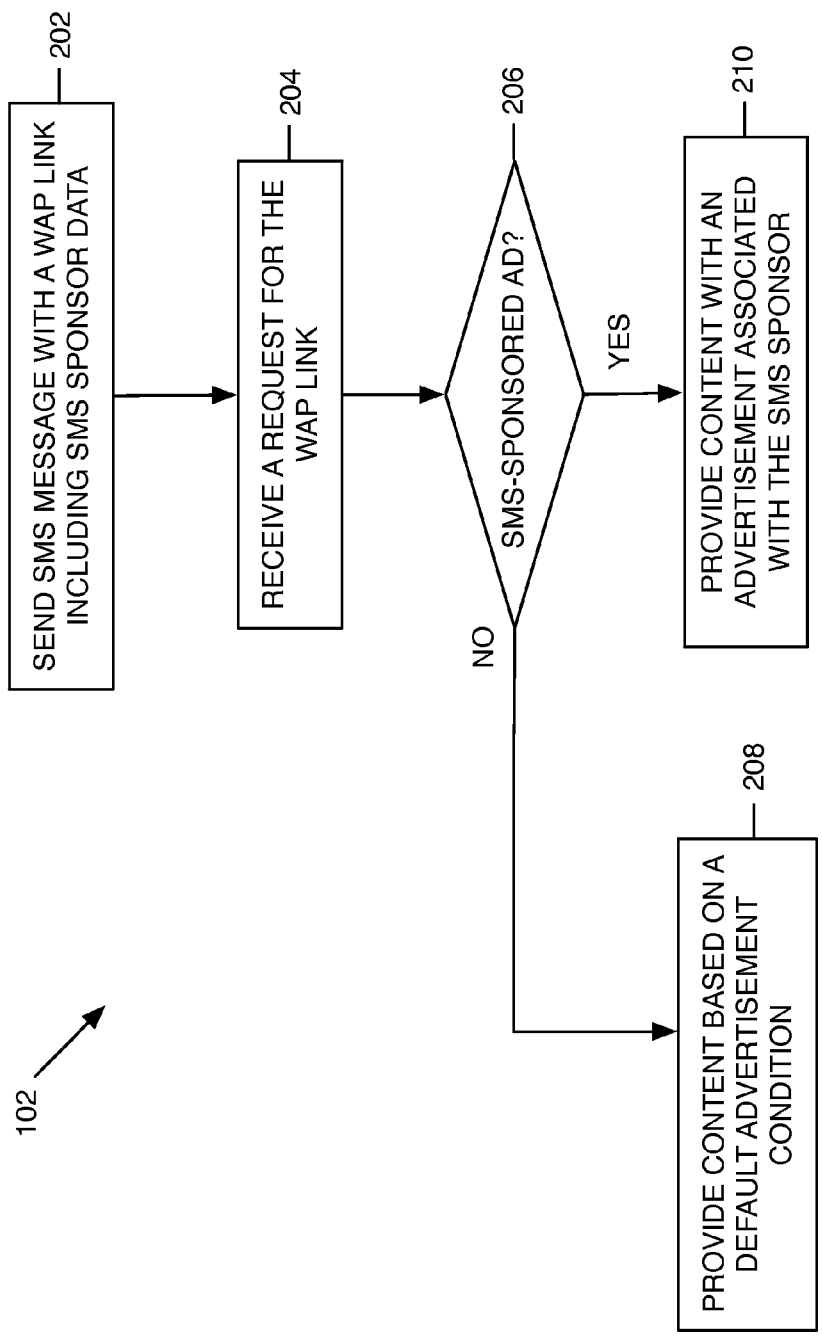
FIG. 2 is a flow chart illustrating the architecture, operation, and/or functionality of an embodiment of the SMS-sponsored WAP advertisement system in the system of FIG. 1.

FIG. 2 is a flowchart illustrating the architecture, operation, and/or functionality of an embodiment of the SMS-sponsored WAP advertisement system 102 of FIG. 1. At block 202, the SMS message 114 (FIG. 1) is provided to the mobile station 108. The SMS message 114 may include a link to a mobile site (e.g., a WAP link 116 to the WAP site 106), which may include the SMS sponsor data 118. In this regard, it should be appreciated that the provider of the SMS application server 112 and the web server 104 may comprise a single service provider or be embodied in a single server or, in alternative embodiments, may be affiliated service providers that have arranged to jointly support the SMS-sponsored WAP advertisement system 102.

Figure 3:
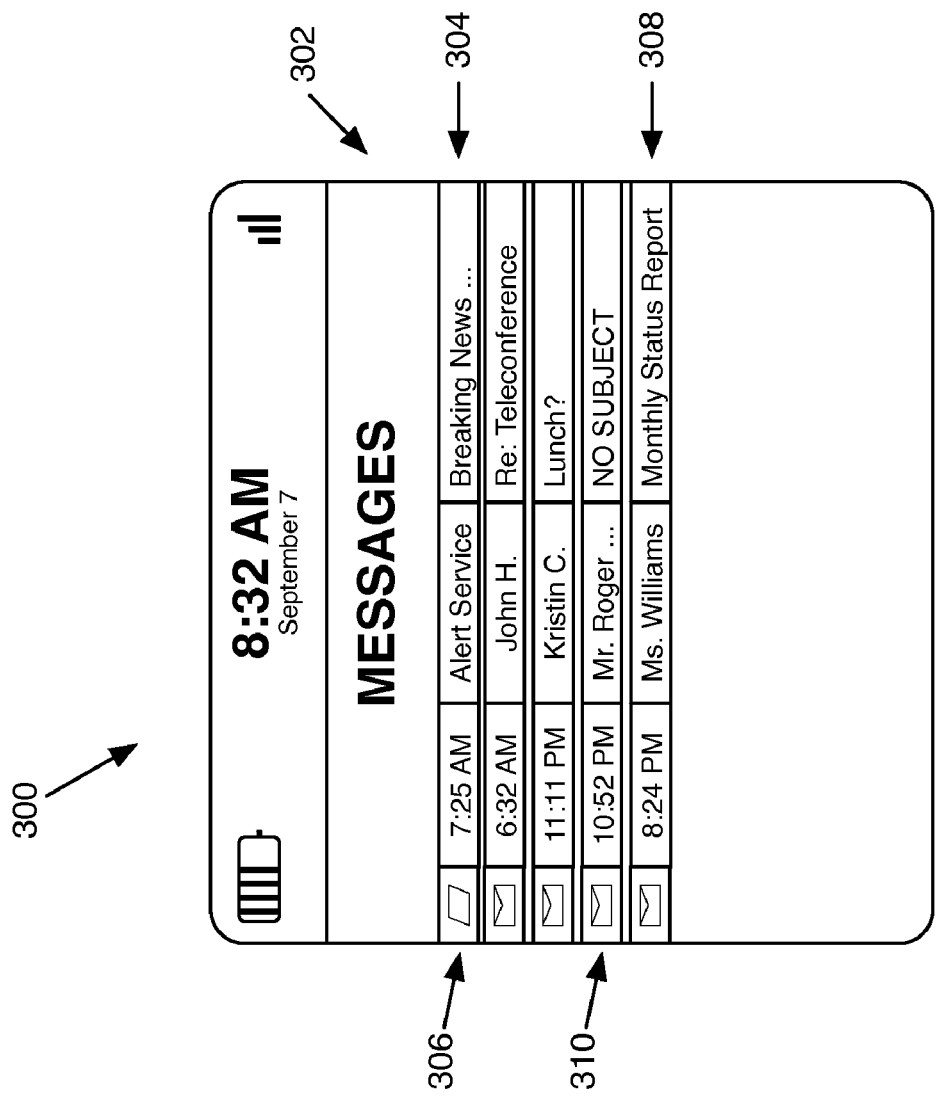
FIGS. 3-5 are screen shots of an exemplary mobile station illustrating, from the user perspective, an embodiment of a method for providing an SMS-sponsored WAP advertisement via the system of FIGS. 1 and 2.
Figure 4:
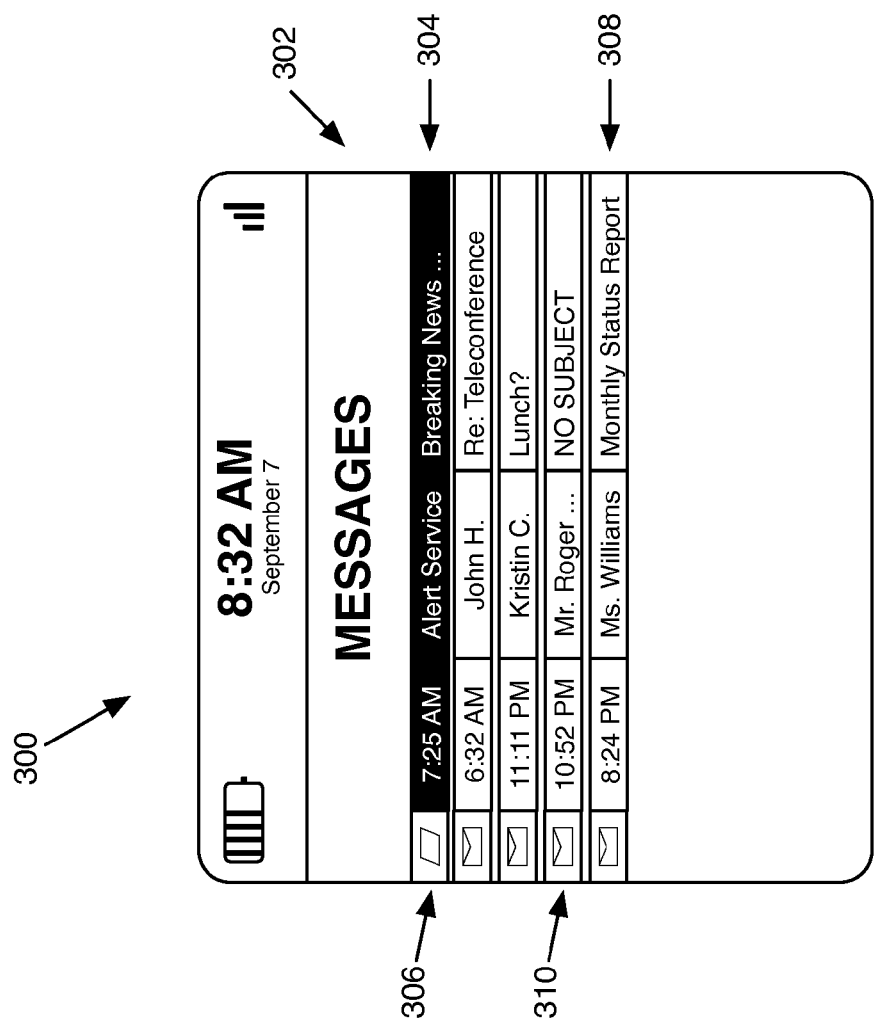
Figure 5:
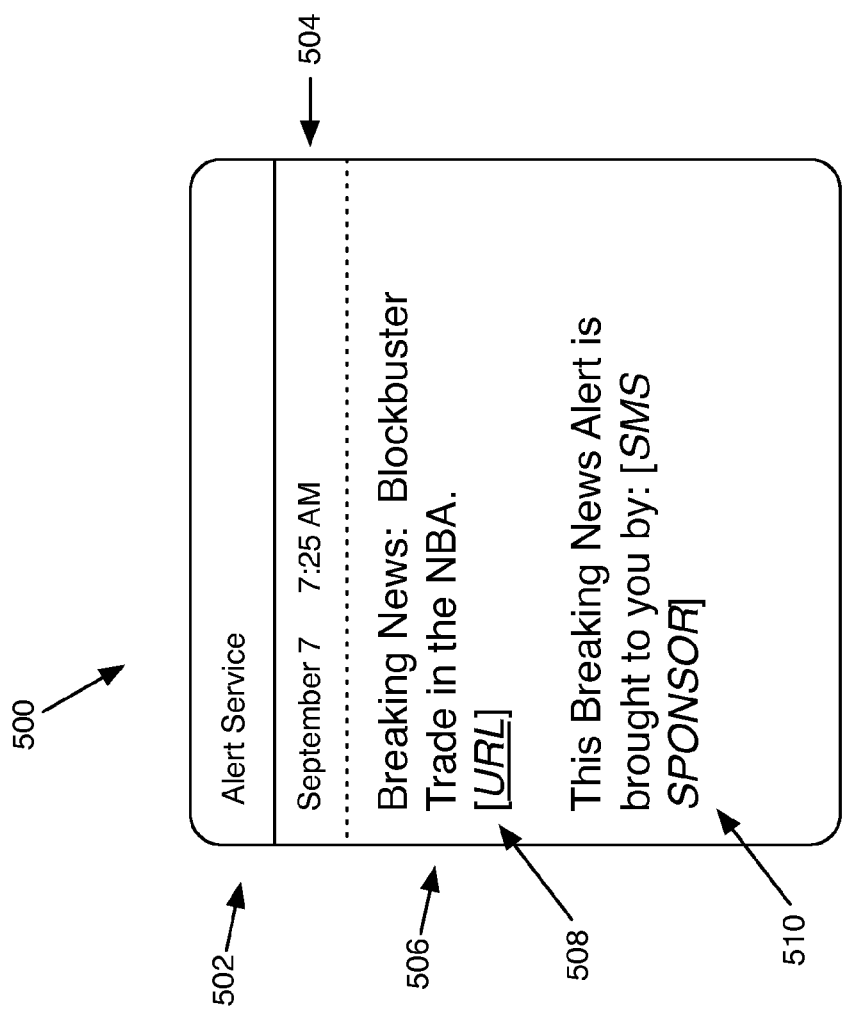

The mobile device 108 receives the SMS message 114 and displays it on the display 126. FIGS. 3-5 illustrate exemplary embodiments of screen shots of the display 126 for presenting the SMS message 114. FIG. 3 is a screen shot 300 illustrating a messages application for viewing messages (e.g., email, text messages, appointment reminders, alerts, etc.). In a portion 302 of the screen, various messages are displayed in rows. Each row may include columns of data fields identifying properties of the corresponding messages (e.g., icons, times, message sender, subject, etc.). Row 304 displays various properties of an embodiment of the received SMS message 114, including the text message icon 306, the time the message was received, the identity of the sender, and the subject of the SMS message 114. Rows 308 display various email messages (identified by email icon 310).

To view the SMS message 114, the user may select and highlight (FIG. 4) and click the row 304 via appropriate user interface features. An embodiment of the received SMS message 114 is illustrated in the screen shot 500 of FIG. 5. As illustrated in this embodiment, the SMS message 114 may identify in a header 502 that the message was sent by an "Alert Service" provided by the SMS application server 112. In sub-header 504, the date and time the message was sent may be displayed. In screen portion 506, the contents of the SMS message 114 may be displayed as a text section displaying a brief alert message, the WAP link 116 (e.g., URL 508), and a sponsor section 510 displaying information associated with an advertiser sponsoring the SMS message 114. It should be appreciated that the content associated with the SMS message may be displayed in various ways and may include, for example, audio, video, text, graphics, or any combination thereof.

The WAP link 116 may be provided in the SMS message 114 in various ways. In an embodiment, a "WAP push" method is implemented, in which the SMS message 114 includes a message and a link. In this method, software on the mobile station 108 is configured to recognize the link and automatically display the link as a "clickable" hypertext link. In another embodiment, the link is embedded in the message as plain text. As mentioned above, the URL 508 may include the SMS sponsor data 118. The SMS sponsor data 118 may correspond to the same advertiser sponsoring the SMS message 114. In this manner, the sponsorship of the SMS message 114 may be extended to the WAP link 116. Advertisers may perceive this as a more valuable advertisement opportunity, which may enable the provider of the SMS application server 112 and/or the web server 104 to generate more revenue per SMS message. In alternative embodiments, the SMS sponsor data 118 may correspond to a different advertiser than SMS sponsor.

If the user is interested in obtaining additional information related to the alert message or alternative or unrelated information (or for any other reason selects the WAP link 116), the mobile station 108 sends a request to the web server 104. Referring again to FIG. 2, at block 204, the SMS-sponsored WAP advertisement system 102 receives the request for the WAP link 116. At decision block 206, the SMS-sponsored WAP advertisement system 102 determines whether the request for the WAP link 116 corresponds to an SMS-sponsored advertisement (i.e., contains the SMS sponsor data 118). In one embodiment, a query string code is embedded in the WAP link 116, and a look-up table maps the code to a particular sponsor. In other embodiments, for example, a special hostname may be used rather than a query string parameter, in which the hostname specifies the sponsor. If the request for the WAP link 116 does not include SMS sponsor data 118, the SMS-sponsored WAP advertisement system 102 executes a default content presentation condition (block 208). The default condition may involve providing the content associated with the WAP site 106 with a default advertisement or, in other embodiments, may involve providing alternative content associated with the WAP site 106 with or without an advertisement. If it is determined that the request for the WAP link 116 includes SMS sponsor data 118, the SMS-sponsored WAP advertisement system 102 may provide the content with an advertisement related to the SMS sponsor (block 210). The advertisement may comprise, for example, a banner advertisement. In alternative embodiments, the WAP site 106 may be presented to support the SMS sponsor's brand (e.g., with particular colors, logos, etc.).

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method of advertising comprising:
   identifying a sponsor for a short message service (SMS) message;
   sending the SMS message to a device, the SMS message comprising message content and a sponsor link to a mobile web site associated with the sponsor, the sponsor link automatically initiating a request for the mobile web site in response to a user selection and having a predetermined parameter associated with the sponsor of the SMS message;
   a server receiving the request for the sponsor link;
   extending sponsorship of the SMS message by the sponsor to the mobile web site by determining that the request for the sponsor link originated from the SMS message based on the predetermined parameter; and
   in response to determining that the request originated from the SMS message, the server providing the mobile site to the device with an advertisement associated with the sponsor of the SMS message.

2. The method of claim 1, wherein the sponsor link comprises a wireless access protocol (WAP) link.

3. The method of claim 1, wherein the predetermined parameter comprises a unique identifier associated with the sponsor.

4. The method of claim 1, wherein the sponsor link comprises a uniform resource locator (URL) containing the parameter.

5. The method of claim 4, wherein the determining that the request originated from the SMS message comprises parsing the URL.

6. A system for providing SMS-sponsored WAP advertisements, the system comprising:
   a short message service (SMS) application server configured to send a sponsored short message service (SMS) message to a mobile terminal, the sponsored SMS message having message content and an embedded sponsor link to a wireless access protocol (WAP) site which automatically initiates a request for the WAP site in response to a user selection of the sponsor link and further includes a predetermined parameter identifying an advertiser sponsoring the sponsored SMS message; and
   a web server configured to:
      receive the request for the WAP site; and
      if the request includes the predetermined parameter identifying the advertiser sponsoring the sponsored SMS message, determine that the request originated from the sponsored SMS message and, in response, extend the sponsorship of the sponsored SMS message to the WAP site by providing the WAP site to the mobile terminal with an advertisement associated with the advertiser.

7. The system of claim 6, wherein the web server is further configured to provide the WAP site to the mobile terminal based on a default condition, if the request does not include the predetermined parameter.

8. The system of claim 6, wherein the SMS application server is associated with a provider of an SMS alert service.

9. The system of claim 6, wherein the embedded sponsor link comprises a uniform resource locator (URL) containing the predetermined parameter.

10. The system of claim 9, wherein the web server is further configured to determine that the request originated from the sponsored SMS message by parsing the URL.

11. The system of claim 6, wherein the SMS application server and the web server comprise a single server.

12. A computer program embodied in a non-transitory computer-readable medium for providing SMS-sponsored WAP advertisements, the computer program comprising logic configured to:
   receive a request for a link to a wireless access protocol (WAP) site;
   determine that the request for the link originated from a sponsored short message service (SMS) message by identifying a predetermined parameter associated with an advertiser sponsoring the sponsored SMS message; and in response to determining that the request originated from sponsored SMS message and identifying the predetermined parameter associated with the advertiser, extend the sponsorship of the sponsored SMS message to the WAP site by serving the WAP site with an advertisement associated with the advertiser sponsoring the sponsored SMS message.

13. The computer program of claim 12, wherein the logic configured to determine that the request originated from the sponsored SMS message comprises: logic configured to determine that the link includes one of a predetermined hostname and a query string code.

14. The computer program of claim 12, wherein the predetermined parameter comprises a unique identifier associated with the advertiser.

15. The computer program of claim 12, wherein the link comprises a uniform resource locator (URL) containing the predetermined parameter.

16. A method comprising:

an advertiser sponsoring a message to be delivered via a communication network;

configuring the message with a first portion comprising message content and a second portion comprising a sponsor link to a web site associated with the advertiser, the sponsor link configured to automatically initiate a request for the web site in response to a user selection;

sending the message to a recipient via the communication network;

a server receiving the request for the web site;

the server determining that the request for the sponsor link originated from the sponsored message based on a predetermined parameter contained in the request; and in response to determining that the request originated from the sponsored message, extending the sponsorship of the message by the advertiser to the web site by providing the web site to the recipient with an advertisement associated with the advertiser that sponsored the sponsored message.

17. The method of claim 16, wherein the message comprises a short messaging service (SMS) message.

18. The method of claim 16, wherein the communication network comprises one or more of a carrier network and the Internet.

* * * * *